(12) United States Patent
Zock

(10) Patent No.: US 12,208,673 B2
(45) Date of Patent: Jan. 28, 2025

(54) AIR CHANNELING ASSEMBLY FOR ALL-TERRAIN VEHICLES

(71) Applicant: Richard Mellick Zock, Lapeer, MI (US)

(72) Inventor: Richard Mellick Zock, Lapeer, MI (US)

( * ) Notice: Subject to any disclaimer, the term of this patent is extended or adjusted under 35 U.S.C. 154(b) by 720 days.

(21) Appl. No.: 17/303,431

(22) Filed: May 28, 2021

(65) Prior Publication Data

US 2022/0379718 A1 Dec. 1, 2022

(51) Int. Cl.
*B60K 11/08* (2006.01)
*B62K 5/01* (2013.01)

(52) U.S. Cl.
CPC ............... *B60K 11/08* (2013.01); *B62K 5/01* (2013.01)

(58) Field of Classification Search
CPC .......... B60K 13/02; B60K 11/08; B62K 5/01
See application file for complete search history.

(56) References Cited

U.S. PATENT DOCUMENTS

| | | | | |
|---|---|---|---|---|
| 4,709,774 A | * | 12/1987 | Saito | B62J 17/02 180/68.1 |
| 4,744,432 A | * | 5/1988 | Shibata | B60K 11/06 180/215 |
| 4,781,258 A | * | 11/1988 | Tamura | B62K 5/01 180/68.1 |
| 6,019,161 A | * | 2/2000 | Travis | B60K 11/08 165/41 |
| 6,651,769 B2 | * | 11/2003 | Laivins | B62J 15/00 180/68.1 |
| 7,040,437 B1 | * | 5/2006 | Fredrickson | B62M 27/02 180/190 |
| 7,080,704 B1 | * | 7/2006 | Kerner | B62M 27/02 180/68.1 |
| 7,347,296 B2 | * | 3/2008 | Nakamura | B62K 5/01 180/68.1 |
| 7,597,387 B2 | * | 10/2009 | Hlopick | B62J 15/00 280/847 |
| 9,446,809 B2 | * | 9/2016 | Sallis | B62J 23/00 |

(Continued)

FOREIGN PATENT DOCUMENTS

| | | | | |
|---|---|---|---|---|
| JP | H01289780 A | * | 11/1989 | |
| JP | 2539200 B2 | * | 10/1996 | |

(Continued)

*Primary Examiner* — Katy M Ebner
(74) *Attorney, Agent, or Firm* — Dunlap Bennett & Ludwig, PLLC

(57) ABSTRACT

An air scoop device having a sidewall longitudinally defined by a leading edge and a trailing edge, the sidewall extending between a top portion and a bottom portion, wherein the top portion, the bottom portion and sidewall define an interior space; an inner portion extending approximately orthogonally from a distal end of the bottom portion, wherein the inner portion further defines the interior space; the top portion having a top leading edge and a top trailing edge; a top cutout extending from the top trailing edge to a top distal end of the top portion; the bottom portion having a bottom leading edge and a bottom trailing edge; and bottom cutout extending from the trailing edge to the inner portion. The present invention may be configured in a kit of two mirror-imaged air scoop devices and a set of installation instructions.

5 Claims, 4 Drawing Sheets

(56) References Cited

U.S. PATENT DOCUMENTS

| | | | | |
|---|---|---|---|---|
| 10,479,194 B1* | 11/2019 | Johnson | ................ | B60K 13/06 |
| 2009/0218152 A1* | 9/2009 | Oohashi | .................. | B62M 7/02 |
| | | | | 180/68.3 |
| 2018/0009500 A1* | 1/2018 | Lovold | ................. | B62K 5/027 |
| 2020/0207202 A1* | 7/2020 | Sakaguchi | ............... | F01P 1/02 |
| 2022/0024296 A1* | 1/2022 | Albesiano | ............... | B62J 17/10 |
| 2022/0379718 A1* | 12/2022 | Zock | ..................... | B60K 11/08 |

FOREIGN PATENT DOCUMENTS

| | | | | |
|---|---|---|---|---|
| JP | 2007062549 A | * | 3/2007 | |
| JP | 2021041736 A | * | 3/2021 | |

\* cited by examiner

AIR CHANNELING ASSEMBLY FOR ALL-TERRAIN VEHICLES

BACKGROUND OF THE INVENTION

The present invention relates to all-terrain vehicles accessories and, more particularly, an air channeling assembly for all-terrain vehicles, a method of making and installing the same, as well as an associated kit. All-terrain vehicles include quad bikes, motorbikes, dirt bikes, go karts, and other times of motorcycles and utility vehicles.

Even though all-terrain vehicles have a "more open" engine compartment, high operating temperatures therein can still result in intake air that is warmer than the ambient temperature, and consequently less dense. These two properties of air (high relative temperature and low density) can hamper the performance of the engine of the all-terrain vehicle.

Furthermore, rocks and debris can be kicked up and be directed toward the all-terrain vehicle's engine compartment during an off-road romp, and those objects can damage components of the engine compartment.

As can be seen, there is a need for an air channeling assembly for all-terrain vehicles, a method of making and installing the same. The air channeling assembly directs air to the motor to provide additional cooling, wherein the design and placement is dimensioned and adapted to enhance beneficial air flow to a specific part of the engine compartment or to the entire motor for better cooling and thermal dispersion. Thereby increasing the engine's effectiveness and providing a significant improvement in power through introducing to the engine cooler, denser outside air. The present invention also contemplates increasing the speed and pressure with which air enters the engine's intake, creating a resonance supercharging effect at very high speeds.

Furthermore, the air channeling assembly can be dimensioned and adapted to shield the engine compartment from the rock and debris kicked up from off-roading. The air channeling assembly can be made from specific materials, such as aluminum, that will not rust or corrode.

SUMMARY OF THE INVENTION

In one aspect of the present invention, an air scoop device includes the following: a sidewall longitudinally defined by a leading edge and a trailing edge, the sidewall extending between a top portion and a bottom portion, wherein the top portion, the bottom portion and sidewall define an interior space; an inner portion extending approximately orthogonally from a distal end of the bottom portion, wherein the inner portion further defines the interior space; the top portion having a top leading edge and a top trailing edge; a top cutout extending from the top trailing edge to a top distal end of the top portion; the bottom portion having a bottom leading edge and a bottom trailing edge; and bottom cutout extending from the trailing edge to the inner portion, wherein said leading edges are coplanar, and wherein said trailing edges are coplanar; a top bracket extending from the top distal end, wherein the top cutout terminates at the top bracket; and a fender retaining element extending from the trailing edge of the sidewall.

In another aspect of the present invention, an air channeling assembly kit for an all-terrain vehicle includes two air scoop devices and an instruction manual.

In yet another aspect of the present invention, a method of improving performance of an engine of an all-terrain vehicle includes providing the air channeling assembly kit; using fasteners to secure the fender retaining elements to an inner fender of the all-terrain vehicle; and securing the inner portions and the top brackets to a frame of the all-terrain vehicle in such a way that the two inner spaces face each other.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
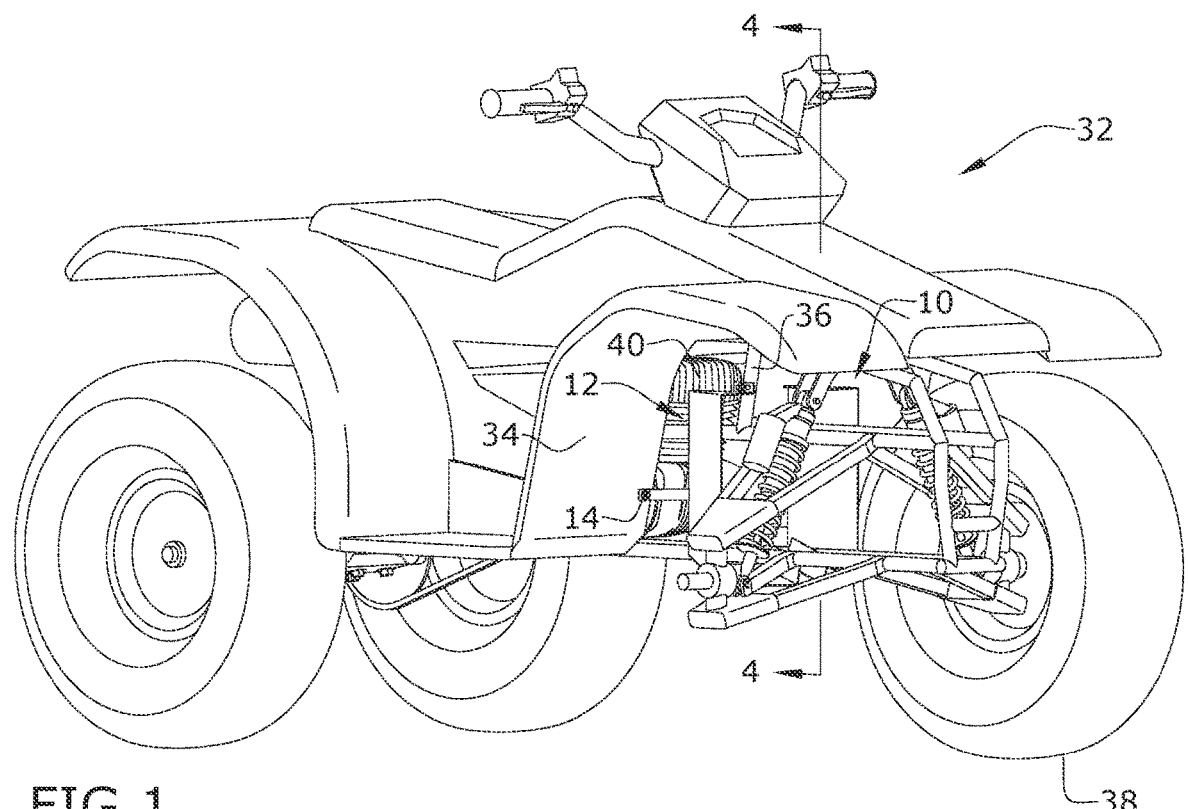
FIG. 1 is a perspective view of an exemplary embodiment of the present invention, shown in use.
Figure 2:
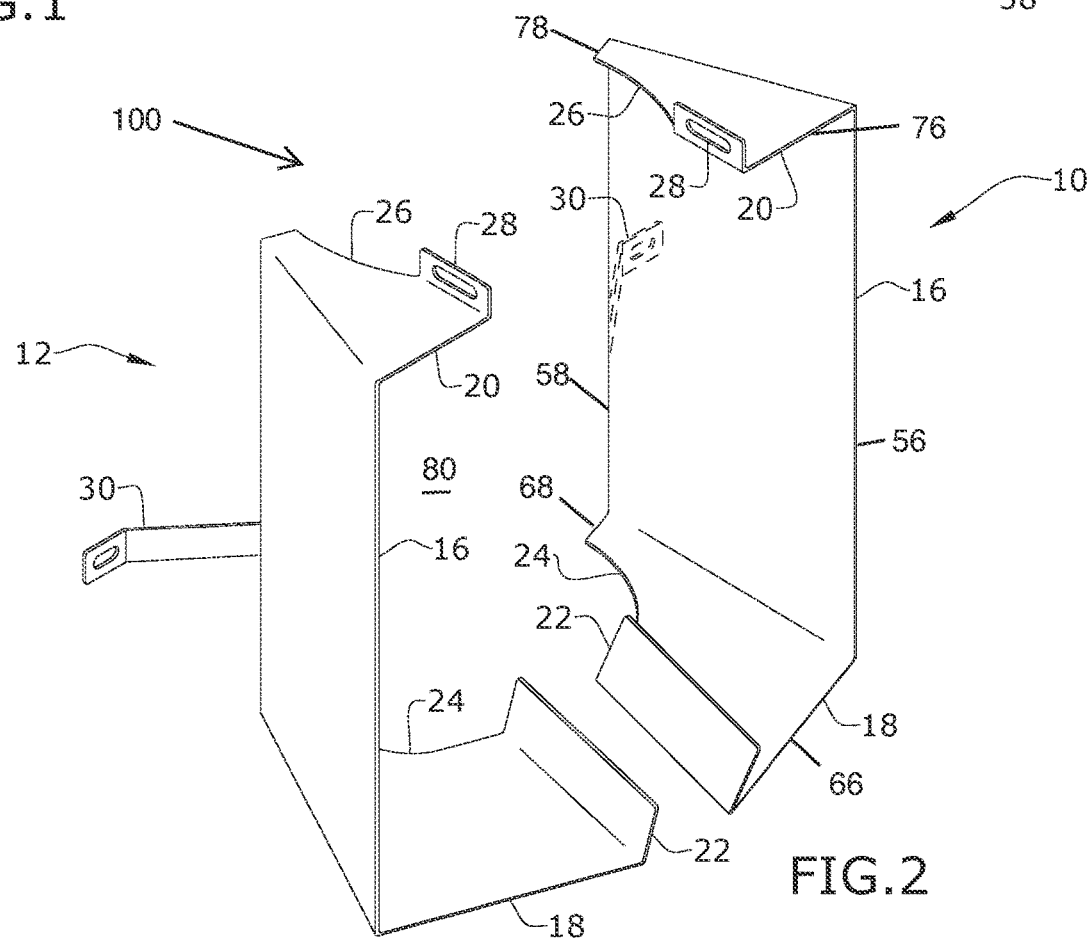
FIG. 2 is a perspective view of an exemplary embodiment of the present invention.
Figure 3:
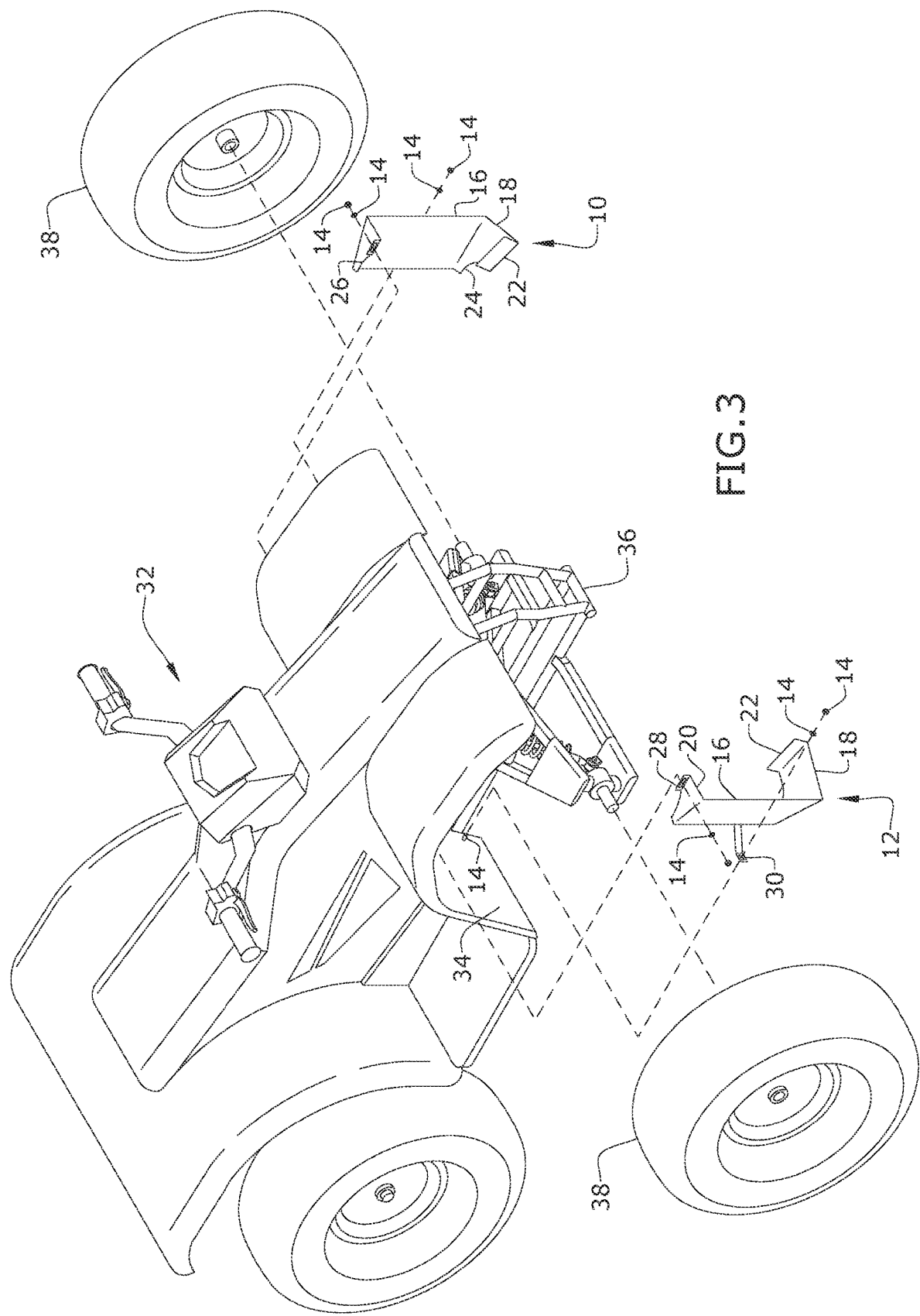
FIG. 3 is an exploded perspective view of an exemplary embodiment of the present invention.
Figure 4:
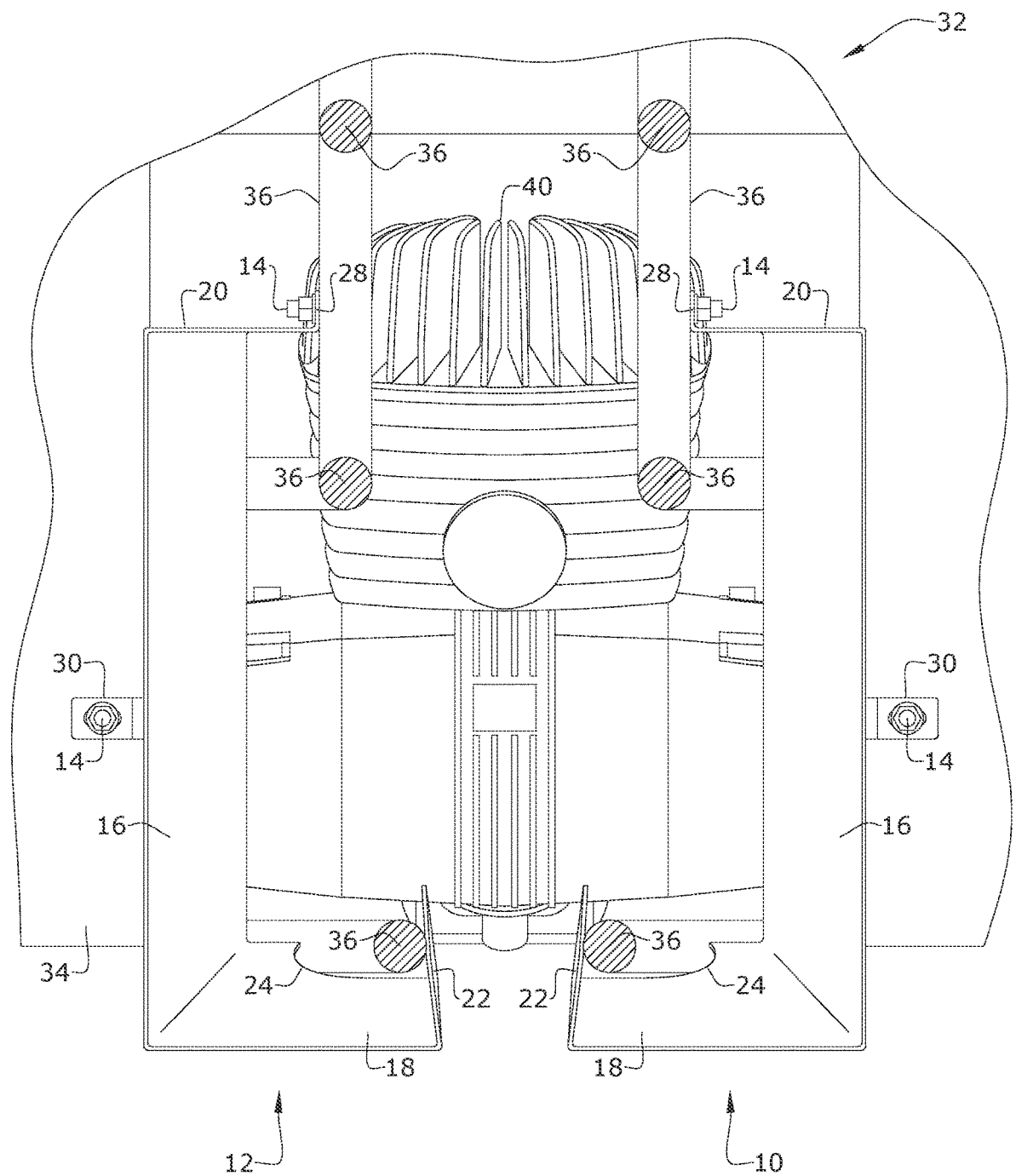
FIG. 4 is a section view of an exemplary embodiment of the present invention, taken along line 4-4 in FIG. 1.
Figure 5:
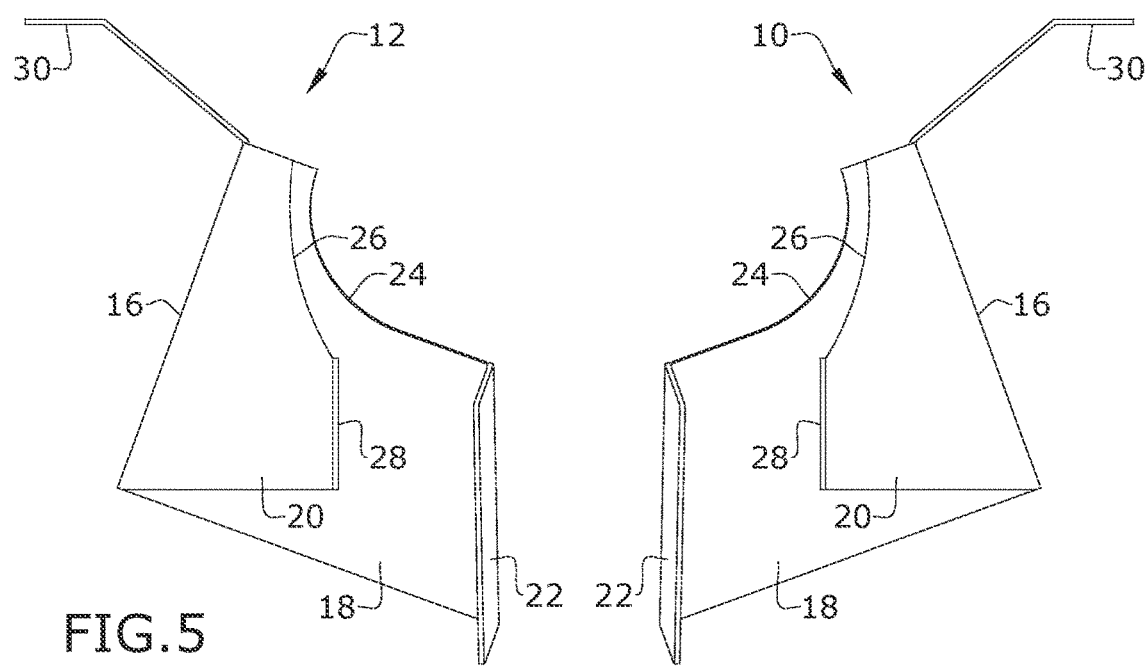
FIG. 5 is a top plan view of an exemplary embodiment of the present invention.
Figure 6:
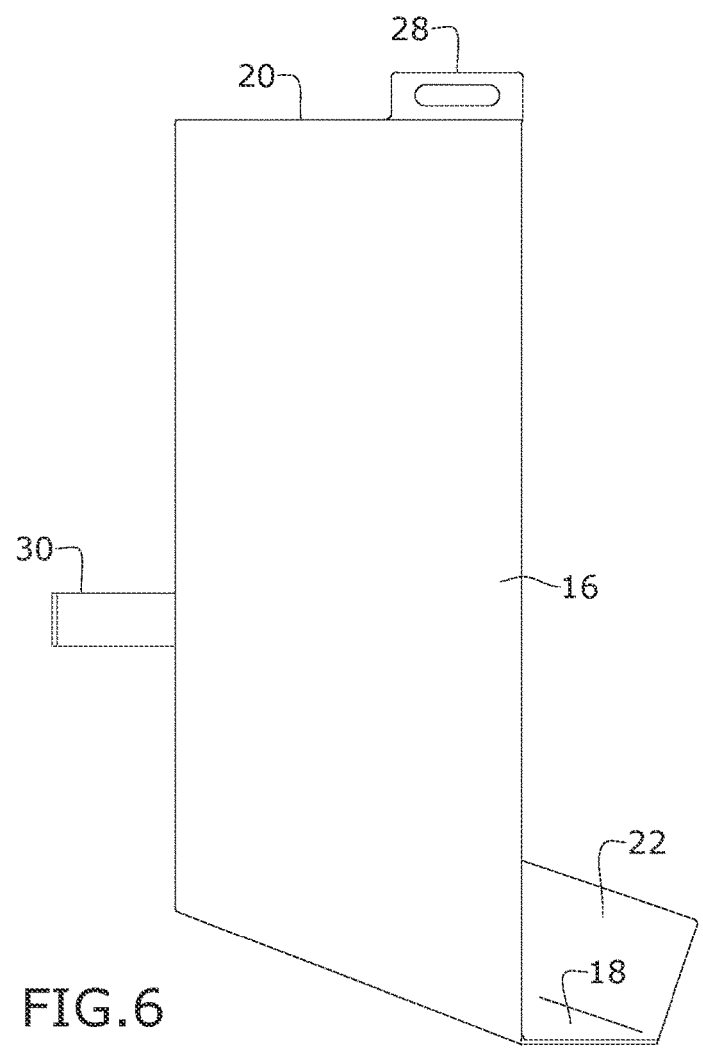
FIG. 6 is a side elevation view of an exemplary embodiment of the present invention.

It should be understood by those skilled in the art that the use of directional terms such as upper, lower, side, left, right and the like are used in relation to the illustrative embodiments as they are depicted in the figures. Specifically, the upper direction being toward the top margin of FIG. 2, the lower direction being toward the bottom of FIG. 2, and the side is the left or right direction, which correspond to the left and right margins of FIG. 2, respectively.

Broadly, an embodiment of the present invention provides an air scoop device having a sidewall longitudinally defined by a leading edge and a trailing edge, the sidewall extending between a top portion and a bottom portion, wherein the top portion, the bottom portion and sidewall define an interior space; an inner portion extending approximately orthogonally from a distal end of the bottom portion, wherein the inner portion further defines the interior space; the top portion having a top leading edge and a top trailing edge; a top cutout extending from the top trailing edge to a top distal end of the top portion; the bottom portion having a bottom leading edge and a bottom trailing edge; and bottom cutout extending from the trailing edge to the inner portion. The present invention may be configured in a kit of two air scoop devices and a set of installation instructions.

Referring now to FIGS. 1 through 6, the present invention may include an air channeling assembly 100 for an all-terrain vehicle 32, a method of making and installing the same.

The air channeling assembly 100 may include a left scoop device 10 and a right scoop 12. Each scoop device 10 and 12 comprises a body having a sidewall 16. The sidewall 16 has a leading edge 56 and a trailing edge 58, wherein the sidewall 16 extends longitudinally between a top portion 20 and a bottom portion 18, wherein the leading edge 56 to the trailing edge 58 define the longitudinal edges of the sidewall 16. The top portion 20 and the bottom portion 18 extend in the same direction, approximately orthogonal relative to the sidewall 16, such that the sidewall 16, the top portion 20 and the bottom portion 18 define a hollow interior space 80. As used in this application, the term "about" or "approximately" refers to a range of values within plus or minus 10% of the specified number (wherein "orthogonal" is deemed to specify a ninety-degree angle).

A distal end of the bottom portion 18 may have an inner portion 22 extending approximately orthogonally upward, thereby further defining the interior space 80 The bottom portion 18 has a bottom leading edge 66 and a cutout 24 extending from a bottom trailing edge 68 towards the inner portion 22.

Similarly, a distal end of the top portion 20 may have an upward approximately orthogonal bracket portion 28. The top portion 20 may have a top leading edge 76 and a cutout 26 extending from a top trailing edge 78 towards the bracket portion 28 of the top portion 20. The leading edges 56, 66, and 76 may be continuous relative to each other, as may be the trailing edges 58, 68, and 79. A fender retaining element 30 may extend from the trailing edge 58, away from the interior space 80, of the sidewall 16.

Each scoop device 10 and 12 may be attached to the all-terrain vehicle 32 with appropriate fasteners 14, including but not limited to mounting bolts, washers and nuts, to hold the fender retaining elements 30 to the inner fender 34 of the all-terrain vehicle 32, secure the inner portions 22 and the bracket portions 28 to the frame structure 36 of the all-terrain vehicle 32 in such a way that each scoop device 10 and 12 and resulting joined interior spaces 80 are in the desired position to allow maximum air flow to the engine 40 of the all-terrain vehicle 32, while not interfering with the optimal operability of the front wheels 38. An instruction manual may be provided with a kit incorporating both the left and right scoop devices 10 and 12.

A method of making the present invention may include the following. Frist a manufacturer may acquire the knowledge that when a motor 40 does not get sufficient air flow to be efficiently powered and how the motor can overheat that can cause serious problems or failure. The manufacturer may acquire the all-terrain vehicle 32 intends to be enhanced with the air scoop devices 10 and 12, then operate the motor in a controlled environment under different operation conditions, taking a base line temperature of the motor, cylinder head, cylinder block and areas that can produce the most amount of heat.

The manufacturer may design a 3D prototype to see the correct size, angles, and dimensions. And fasten the air scoop devices 10 and 12 to the mounting points and visually see how the air would travel to the motor 40 and which points the motor 40 would be cooled. The manufacturer may provide another controlled test with the prototype, see any temperature changes on the motor 40, see if any improvements can be done to the left and right scoop devices 10 and 12.

A method of using the present invention may include the following. The air channeling assembly 100 disclosed above may be provided. A user may simply install the air scoop devices 10 and 12 with the hardware and fasteners 14 described above. In certain embodiments, the user may follow the instructions of the instruction manual provided in a kit configuration.

It should be understood, of course, that the foregoing relates to exemplary embodiments of the invention and that modifications may be made without departing from the spirit and scope of the invention as set forth in the following claims.

What is claimed is:

1. An air scoop device, comprising:
a sidewall longitudinally defined by a leading edge and a trailing edge, the sidewall extending between a top portion and a bottom portion, wherein the top portion, the bottom portion and sidewall define an interior space, wherein the top portion extends orthogonally from the sidewall to define an overhang over a portion of the interior space, and wherein the bottom portion extends orthogonally from the sidewall to define a floor under said portion of the interior space;
an inner portion extending approximately orthogonally from a distal end of the bottom portion, wherein the inner portion further defines the interior space;
the top portion having a top leading edge and a top trailing edge;
a top cutout extending from the top trailing edge to a top distal end of the top portion;
the bottom portion having a bottom leading edge and a bottom trailing edge; and
bottom cutout extending from the bottom trailing edge to the inner portion.

2. The air scoop device of claim 1, further comprising a top bracket extending from the top distal end, wherein the top cutout terminates at the top bracket.

3. The air scoop device of claim 2, further comprising a fender retaining element extending from the trailing edge of the sidewall.

4. An air channeling assembly kit for an all-terrain vehicle, comprising:
two air scoop devices of the air scoop device of claim 3, wherein said two air scoop devices are mirror images of each other; and
an instruction manual.

5. A method of improving performance of an engine of an all-terrain vehicle, the method comprising:
providing the air channeling assembly kit of claim 4;
using fasteners to secure the fender retaining elements of the two mirror image air scoop devices, respectively, to an inner fender of the all-terrain vehicle; and
securing the inner portions and the top brackets of the two mirror image air scoop devices, respectively, to a frame of the all-terrain vehicle in such a way that the two inner spaces face each other.

* * * * *